Dec. 24, 1968  R. J. ANDREWS  3,417,412
FOLDING STRETCHER
Filed April 11, 1967   2 Sheets-Sheet 1

INVENTOR.
Robert J. Andrews
BY
C. E. Vautrain Jr., Agent

United States Patent Office 3,417,412
Patented Dec. 24, 1968

3,417,412
FOLDING STRETCHER
Robert J. Andrews, Hubert, N.C., assignor to the United States of America as represented by the Secretary of the Navy
Filed Apr. 11, 1967, Ser. No. 630,484
10 Claims. (Cl. 5—82)

ABSTRACT OF THE DISCLOSURE

A stretcher or litter is provided having segmented carrying poles and hinges which permit 180° folds in one direction and have a reinforced stop in the opposite direction to form straight poles in the carrying attitude. Spreader bars serve to space the opened litter off the ground and remain attached through all stages of operation of the litter. The spreader bars and hinges permit the litter to be folded to a compact, minimum volume for packing through rough terrain.

---

The invention described herein may be manufactured and used by or for the Government of the United States of America for governmental purposes without the payment of any royalties thereon or therefor.

This invention relates to liters for military or civilian use and more particularly for use in areas where the litter must be packed through rough terrain to the site of a casualty.

Folding litters are desirable in many areas and are essential in combat areas, yet there seems to have been little effort devoted to their improvement in recent years. Where the terrain of the combat area is essentially flat, the conventional litter although bulky and unnecessarily heavy is acceptable. Where, however, the terrain is rough with or without thick undergrowth, packing a conventional litter is tedious to such an extent as to impair freedom of movement of the pack carrier. Nylon litters have been adapted to overcome this difficulty and though easily carried to the site of a casualty such litters require six litter bearers to carry one casualty from the area. Attempted improvements directed toward compactness alone or toward features which provide for alternate use of the folded litter do not relieve conventional forms of the fundamental disadvantages which are overcome by the present invention.

Basically, the present invention comprises a litter or stretcher having a plurality of sections of substantially equal length interspersed by spacer sections. Hinges which connect adjacent sections permit the litter to be folded in one continuous series of steps in a single rotary direction. In a preferred embodiment, the hinges at the first fold rotate through 180° while those at succeeding folds are paired, each hinge rotating through 90°. The spacer sections provide a transverse spacing sufficient to accommodate the poles and cover material of folded sections, while spreader bars in the end sections provide transverse rigidity in addition to elevating the cover material above the supporting surface.

Accordingly, it is an object of this invention to provide a litter which may be compactly folded and packed through rough terrain with much less difficulty than is encountered with present folded-pole litters.

Another object of the present invention is to provide a lightweight yet sturdy litter which may be quickly set up for use and folded for transport.

Figure 1:
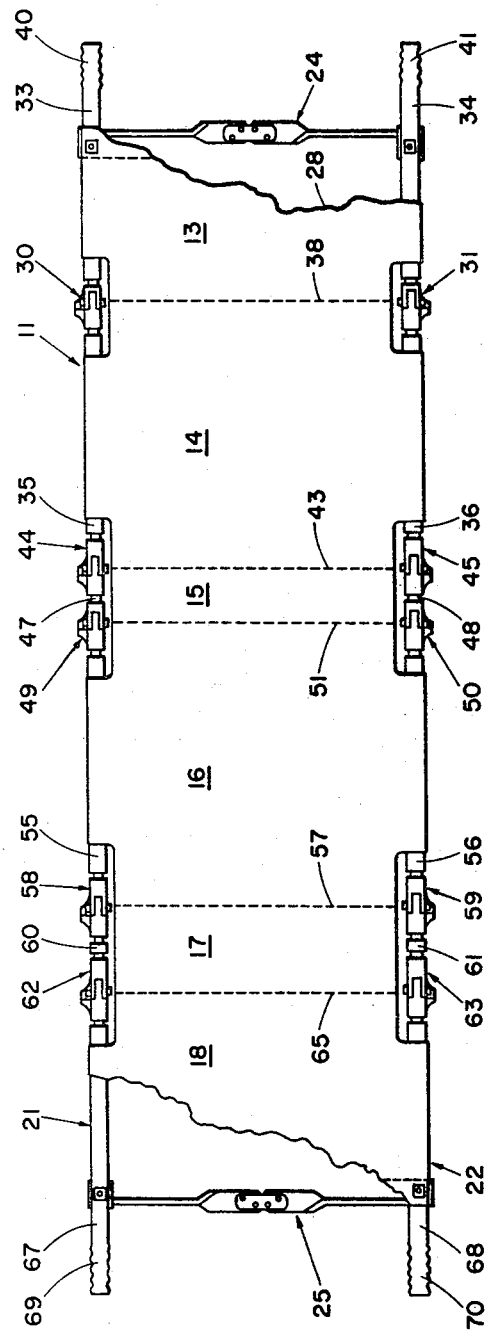
Figure 2:
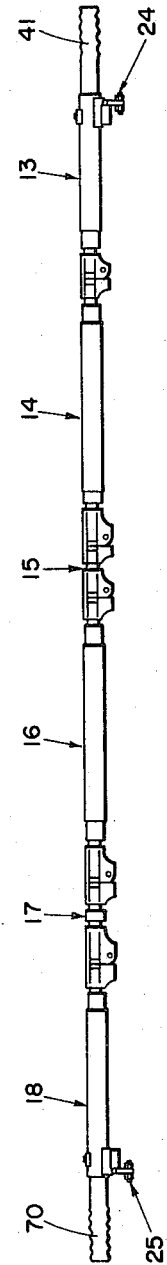
Figure 3:
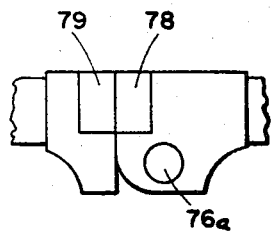
Figure 4:
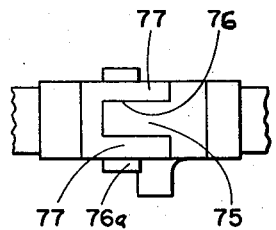
Figure 5:
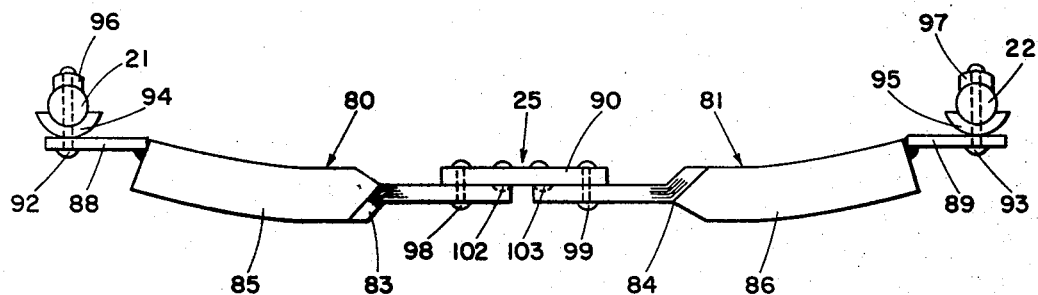
Figure 6:
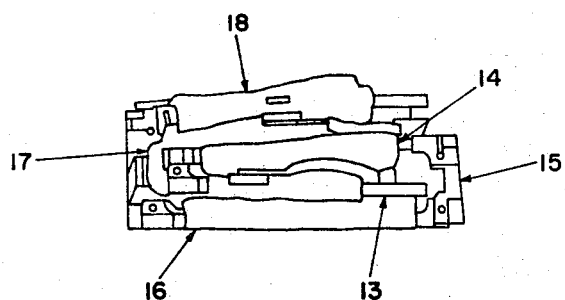

Other objects, advantages and novel features of the invention will become apparent from the following detailed description thereof when considered in conjunction with the accompanying drawings in which like numerals represent like parts throughout and wherein:

FIG. 1 is a plan view partly cut away of a preferred embodiment unfolded and deployed for use;
FIG. 2 is a side elevation of the embodiment of FIG. 1;
FIG. 3 is an enlarged side elevation of one of the hinges in the embodiment of FIG. 1;
FIG. 4 is a plan view of the hinge shown in FIG. 3;
FIG. 5 is an enlarged side elevation of one of the spreader bars; and
FIG. 6 is a perspective view of the embodiment of FIG. 1 in folded form.

Referring to FIGS. 1 and 2, there is shown a litter 11 in fully extended form and including a pluarility of sections 13 through 18 arranged to permit litter 11 to be folded into a minimum space. Each section comprises a pair of pole segments forming composite poles 21 and 22, while end sections 13 and 18 include, respectively, spreader bars 24 and 25. A web means such as nylon cover 28 is secured over the segments of poles 21 and 22 to form a supporting surface for carrying a casualty.

A single pair of hinges 30 and 31 join section 13 to section 14, connecting pole segments 33 and 34 of section 13 to pole segments 35 and 36 of section 14, respectively. Hinges 30 and 31 rotate about an axis 38, the length of section 13 from the end of respective hand grip areas 40 and 41 to axis 38 being slightly less than the length of section 14, having pole segments 35 and 36, from axis 38 to a succeeding axis 43 about which hinges 44 and 45 rotate. Section 15 is a spacer section which accommodates or spans the thickness of folded sections 13 and 14 and includes pole segments 47 and 48 which connect hinges 49 and 50 having an axis of rotation 51. Section 16 includes pole segments 55 and 56 and extends from axis 51 to a succeeding axis 57 about which hinges 58 and 59 rotate. Section 17 is also a spacer section and spans or accommodates the thickness of folded sections 13, 14 and 16. A pair of pole segments 60 and 61 in section 17 connect hinges 58 and 59 to a succeeding pair of hinges 62 and 63 having an axis of rotation 65. A pair of pole segments 67 and 68 having hand grip areas 69 and 70 are included in section 18.

FIGS. 3 and 4 show the hinges in greater detail, each hinge preferably including a tongue 75 which is movable in close fitting relationship within a groove 76. The hinge components pivot about a shaft 76a and are curved in the yoke forming groove 76 as indicated at 77 to accommodate the base of tongue 75. A pair of stabilizing pads 78 and 79 abut in the operative condition to maintain the pole segments in alignment under load carrying conditions.

The details of the construction of a preferred form of spreader bar 24 are shown in FIG. 5. The bar is made from flat metal strips 80 and 81 turned substantially 90° as indicated at intermediate points 83 and 84, respectively, to form depending ssupport areas 85 and 86 which assist in elevating poles 21 and 22 a selected distance above a supporting surface. Strips 80 and 81 preferably are attached at their outer ends to pivotable connecting rods 88 and 89, preferably by welding, and are pivotally attached at their inner ends to a plate 90. Rods 88 and 89 and attached strips 80 and 81 pivot about the shafts of respective bolts 92 and 93 which are secured to poles 21 and 22 through bushings 94–95 and 96–97, the bushings preferably conforming to the periphery of the poles. Strips 80 and 81 pivot about the shafts of bolts 98 and 99 and are locked in place transversely by conventional means such as spring-loaded detents 102 and 103.

In FIG. 6 the entire assembly is shown folded for stowage or back packing. The steps in preparing the assembly for transport are first to turn the litter over and thereafter unlock spreader bars 24 and 25 from their transversely extending position, folding them with plates 90 disposed outward from each other so as to position poles 21 and 22 adjacent one another. Section 13 then is folded over section 14 and in the same direction of fold, sections 13 and 14 are folded over section 16. Section 18 now is folded over 16 completing the assembly. Straps, not shown, may be tightened about the folded litter and the litter may be slung on the back of a carrier in a harness or other conventional means, not shown. Alternatively, the folded litter may be inserted in a carrying sack, not shown, for transportation. The reverse of the foregoing steps are followed in unfolding the litter and deploying it for use.

The pole segments, hinges and spreader bars preferably are made of aluminum or aluminum alloy although other materials such as steel and fiberglass may be used.

Among the advantages of litter 11 are its ease in being folded for carrying and its compactness and light weight which permit it to be packed through rough terrain free of the impediments of heavier and more bulky conventional litters. The tongue and groove hinges when opened provide substantially rigid poles for carrying a casualty, with stabilizing pads 78 and 79 effectively assisting in supplying such rigidity. The sequentially arranged sections permit the unit to be folded in a single direction on the supporting surface thereby making folding easier and more rapid than in conventional litters.

The present litter when folded may be made more compact than conventional litters and especially so lengthwise where the maximum length is that of pole segments 55 and 56 and their attached hinges which extend to axes 51 and 57. Thus where the carrying poles of conventional litters generally are divided into four equal sections whose common length is therefore one-fourth the length of the extended poles, the comparable length of the folded present litter is shorter by a fraction of the length of sections 15 and 17.

Obviously many modifications and variations of the present invention are possible in the light of the above teachings. For example, the hinges and the spreader bars may be varied in construction while still retaining the principal features of the invention. It is therefore to be understood that within the scope of the appended claims the invention may be practiced otherwise than as specifically described.

What is claimed is:

1. In a litter or stretcher of the type wherein the carrying poles are segmented by hinges to permit sectional folding thereof the combination of:

a selected number of additional pairs of hinge means positioned between sections to permit folding said litter in consecutive folds in a single direction, said additional pairs of hinge means being positioned with respect to the hinges so as to provide space where required to accommodate the thickness of sections in the folded litter, whereby a litter is provided which when folded has only one open end to be secured for portage and stowage and may be opened quickly by a simple unrolling operation.

2. The device of claim 1 wherein the litter comprises four sections, said additional pairs of hinge means being inserted adjacent the hinges between the second and third sections and the third and fourth sections when counting from an end section of the litter; and a spacer positioned intermediate the hinges and the additional pair of hinge means separating the third and fourth sections for accommodating two folded sections.

3. The device of claim 2 wherein said hinges and said additional hinge means are provided with tongues in one member which slide within grooves in the companion member to provide increased lateral stability when the litter is in use under load conditions.

4. A litter sectioned for sequential folding into a minimum volume for back packing under severe conditions of terrain and growth comprising:

a pair of carrying poles segmented by pairs of hinges to form a plurality of sections including two end sections and at least one intermediate section, all of said sections being of substantially the same length;

said intermediate section connected to one end section by an additional pair of hinges spaced substantially adjacent the pair of hinges connecting said sections;

each of said pairs of hinges having a common axis of rotation;

said common axes of rotation of two adjacent pairs of hinges disposed apart a sufficient distance to accommodate at least one folded section; and pivotable spreader means in said end sections connecting said carrying poles to provide stability and stiffness, said spreader means when deployed extending below said litter and supporting said litter a selected distance above the surface on which it rests.

5. In a litter or stretcher of the type wherein the carrying poles are segmented by hinges to permit sectional folding thereof the combination of:

at least two pairs of hinge means in excess of the number of folded sections of the litter, said excess pairs of hinges inserted adjacent the second and third folds of the litter to permit succeeding unfolded sections of the litter to be folded upon preceding folded sections thereof, said hinge means including pivot members of sufficient length to space the second from one section when folded from the end and next to end sections when folded so that the second from end section may be folded upon the end section in sequential folding of the litter; and said hinge means further including spacer means inserted between hinge means of the second from end and third from end sections of the litter so that the third from end section may be folded upon the next to end section of the litter.

6. The device of claim 5 wherein said hinge means include hinges having tongues in one member which slide within grooves in the companion member to provide increased lateral stability when the litter is in use under load conditions.

7. The device of claim 6 wherein said hinge means further include laterally extending stabilizer means oppositely disposed in the hinge members so as to abut and provide longitudinal stiffness.

8. The device of claim 7 and further including pivotable spreader means connected between the carrying poles in the end sections of the unfolded litter;

said spreader means adapted to provide lateral stability and stiffness under load conditions of said litter.

9. The device of claim 8 wherein said spreader means in the operative condition extend below said litter so as to support the carrying poles thereof a selected distance above a supporting surface.

10. The device of claim 9 wherein the portions of said spreader means adjacent the carrying poles are in substantial alignment with the longitudinal axes of the carrying poles when the litter is folded for packing and stowage.

References Cited

UNITED STATES PATENTS

| | | | |
|---|---|---|---|
| 1,129,089 | 2/1915 | Hajas | 5—82 |
| 2,378,809 | 6/1945 | Thomson et al. | 5—82 |
| 2,396,931 | 3/1946 | Schmid | 5—82 |
| 2,650,373 | 9/1953 | Zeller et al. | 5—82 |

CASMIR A. NUNBERG, *Primary Examiner.*

U.S. Cl. X.R.

5—114